Patented Oct. 17, 1950

2,526,218

UNITED STATES PATENT OFFICE 2,526,218

SOLUBILIZED AZO DYE

Marvin H. Gold and Harold H. Levine, Chicago, Ill., assignors to The Visking Corporation, Chicago, Ill., a corporation of Virginia No Drawing. Application December 20, 1946, Serial No. 717,612

1 Claim. (Cl. 260—144)

This invention relates to dyes, and to the method of preparing the same. More particularly, it relates to new solubilized dyes, and to a new and improved method for producing the same.

In the dye industry, solubility characteristics are imparted to various dyes by attaching a solubilizing group directly on the nucleus. This has been accomplished, in general, by a sulfonation of the dye intermediates directly on the aromatic nucleus. Such sulfonations have obvious disadvantages, since the introduced sulfonic acid group interferes with the orientation upon adding further substituents to the molecule. Furthermore, the sulfonation reaction is usually highly oxidative in nature and often causes a loss in difficultly available starting materials.

An object of this invention is to provide a new and improved method of producing solubilized dyes, as well as such solubilized dyes.

Another object of this invention is to provide a method wherein the sulfonation of the aromatic nucleus to improve solubility is avoided.

Other and additional objects of this invention will become apparent hereinafter.

In general, the objects of this invention are accomplished by coupling a diazotized or a polydiazotized aromatic amine with a water-soluble sulfonate containing an activated methylene ($=CH_2$) or methenyl ($\equiv CH$) group such as sulfonates of beta-nitro alkanes.

In sulfonates of beta-nitro alkanes the methylene or methenyl group is said to be activated due to the fact that the activating group, i. e., nitro group, is directly attached to the carbon atom of the said methylene or methenyl group.

Any water-soluble sulfonate of a beta-nitro alkane in which the nitro group is directly attached to the methylene or methenyl group in the chain can be used. Such sulfonates can be prepared by the method disclosed in copending application Serial No. 617,929, filed September 21, 1945, now Patent No. 2,510,281, issued June 6, 1950.

The following are illustrative specific examples of beta-nitro alkane sulfonates containing an active methylene or methenyl group which can be used in the process:

Ammonium-2-nitroethane-1-sulfonate
Ammonium-1-nitropropane-2-sulfonate
Potassium-2-nitrobutane-1-sulfonate
Sodium-2-nitropropane-1-sulfonate
Sodium-2-phenyl-2-nitroethane-1-sulfonate
Ammonium-12-nitrododecane-1-sulfonate Any diazonium or polydiazonium (such as tetrazonium) compound which in the reaction forms a stable coupled product can be used in the process. Diazotized p-toluene nitroaniline, diazotized benzidine, diazotized p-amino azobenzene, tetrazotized benzidine, diazotized 2-amino-5-azotoluene, and diazotized alpha-naphthylamine are a few illustrative examples of diazonium and polydiazonium compounds which can be used in the process.

The coupling occurs by replacement of a hydrogen atom on the activated methylene or methenyl carbon, as is represented by the following equation showing the reaction of phenyl diazonium chloride with ammonium-2-nitrobutane-1-sulfonate:

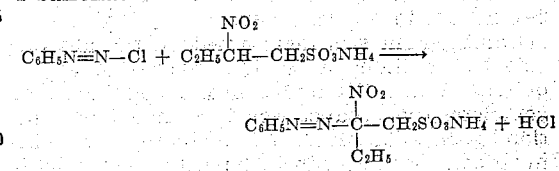

As is shown by the above equation, the reaction takes place when the reactants are present in stoichiometric proportions. The reaction will also take place when either reactant is in excess of its stoichiometric requirements. In practice, an excess of the activated sulfonate is preferred in order to insure complete reaction with the less readily prepared diazonium compounds.

In general, the reaction is more successful when carried out under non-acid conditions, such as neutral or preferably slightly alkaline conditions. The desired conditions are obtained by the use of appropriate buffer, which neutralizes the acidity of the diazonium solution and maintains an alkaline reaction medium, or by additions to the reaction medium of an alkali in an amount sufficient to maintain the reaction medium on the alkaline side.

The coupling reaction is preferably carried out at a temperature between room temperature (20° C.) and 50° C. However, the coupling reaction can be effected at a temperature as low as 10° C. or as high as 70° C.

The details and manner of practicing the invention will become apparent by reference to the following specific examples, it being understood that these examples are merely illustrative embodiments of the invention and that the scope of the invention is not limited thereto. Throughout the examples the proportions are by weight unless otherwise specified.

*Example 1*

A slurry of p-nitroaniline in 200 cc. water and 24 cc. hydrochloric acid was diazotized by adding 7.2 g. sodium nitrite at 15° C. When diazotization was complete, excess nitrous acid was destroyed with sulfamic acid and the solution filtered. The filtrate was then rapidly added to 28 g. of ammonium-2-nitropropane-1-sulfonate and 25 g. of sodium acetate in 200 cc. water at room temperature. An orange precipitate of self-coupled product formed while stirring overnight. This was removed by filtration, and the filtrate saturated with sodium chloride, whereupon a canary yellow product was precipitated and it was extracted with methanol in a Soxhlet extractor to remove the product from inorganic salts and further purified by recrystallization from a benzene-methanol mixture. Upon analysis, the product was identified as sodium-2-nitro-2-(p-nitrobenzeneazo) propane-1-sulfonate.

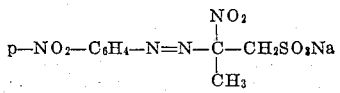

Analysis calculated for $C_9H_9N_4O_7SNa$: Na, 6.8%; S, 9.4%. Found: Na, 6.2%; S, 7.9%.

The product was water-soluble and dyed silk yellow.

*Example 2*

A slurry of 9.2 g. benzidine, 30 cc. hydrochloric acid and 200 cc. water, after cooling to 4° C., was diazotized with 7.2 g. sodium nitrite. The excess nitrous acid was removed with sulfamic acid and the solution filtered. The diazonium solution was then added at 50° C. to a solution containing 27.9 g. of ammonium 2-nitropropane-1-sulfonate in 200 cc. water. The pH of the reaction medium was maintained on the alkaline side by additions of sodium hydroxide as required. When the addition and coupling were complete, the product was thrown out of solution by the addition of sodium chloride. A gummy precipitate formed which hardened upon cooling to 10° C. The material was filtered, dried and then extracted in a Soxhlet extractor with methanol to separate it from inorganic salts. Concentration of the methanol solution and fractional crystallization gave two products, A and B. Fraction A was determined to be disodium-2-(p'-2-(-2-nitropropyl-1-sulfonate)-p-azodiphenyl)-2-nitropropane-1-sulfonate.

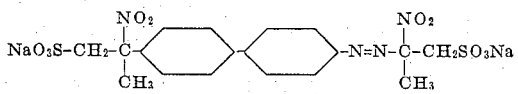

Analysis calculated for $C_{18}H_{18}N_4O_{10}S_2Na_2$: Na, 8.2%; S, 11.4%; N, 10.0%. Found: Na, 8.2%; S, 10.7%; N, 9.4%.

This was an orange-brown water-soluble material which dyed silk a yellow orange.

Fraction B was determined to be sodium-2-p-(p'-hyroxydiphenyl) azo-2-nitropropane-1-sulfonate, a water-soluble orange-brown dye which dyed silk a yellow-orange.

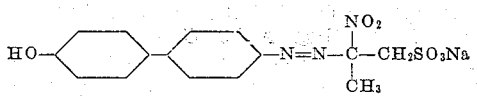

Analysis calculated for $C_{15}H_{14}N_3O_6SNa$: Na, 5.9%; S, 8.3%; N, 10.9%. Found: Na, 6.6%; S, 9.5%; N 10.9%.

*Example 3*

A slurry of 9.9 g. p-aminoazobenzene, 30 cc. concentrated hydrochloric acid, and 200 cc. water was diazotized at 0° C. After removal of excess nitrous acid with sulfamic acid, the diazonium solution was added at 0° C. to 20.5 g. of 88% "H" acid (1-amino-8-naphthol-3,6-disulfonic acid) dissolved in water and sodium hydroxide The pH was constantly checked to maintain alkalinity by addition of sodium hydroxide as needed. This gave a deep purple solution of dye. This material was further diazotized at 0° C. by neutralizing the solution and adding 50 cc. excess concentrated hydrochloric acid and sodium nitrite. The excess nitrous acid was destroyed with sulfamic acid and the solution added at room temperature to 10 g. ammonium-2-nitrobutane-1-sulfonate dissolved in 200 cc. water and made alkaline with sodium hydroxide. The solution was kept alkaline by periodic additions of sodium hydroxide as needed. This gave a very intense purple solution from which no product could be precipitated by the addition of salt or acidification. After the first coupling, the product was readily precipitated upon the addition of acid but, after coupling with the nitrosulfonate, the solubility had been enhanced to such a degree that it could no longer be precipitated. This solution of soluble dye gave the following stable colors with various fibers:

Cotton_____ Amethyst
Wool_____ Light voilet
Aralac_____ Light voilet
Silk_____ Violet
Raw silk_____ Very deep purple
Rayon_____ Bright violet

*Example 4*

A slurry of 11.3 g. 2-amino-5-azotoluene, 25 cc. concentrated hydrochloric acid and 200 cc. water was diazotized at 5° C. with 3.7 g. sodium nitrite. The excess nitrous acid was destroyed with sulfamic acid and the solution filtered. The filtrate was added at 50° C. to 20 g. of ammonium 2-nitrobutane-1-sulfonate and 25 g. sodium acetate dissolved in 200 cc. water. A reddish-brown solution was formed containing a small amount of precipitate which was discarded. The filtrate dyed the following fibers:

Raw silk_____ Bright orange
Nylon_____ Yellow-orange
Acetate rayon_____ Bright golden orange

*Example 5*

A slurry of 7.2 g. alpha-naphthylamine, 55 cc. concentrated hydrochloric acid and 200 cc. water was diazotized at 5° C. with 3.6 g. sodium nitrite. After removal of excess nitrous acid with sulfamic acid, the solution was filtered and added at 50° C. to 10 g. ammonium 2-nitrobutane-1-sulfonate in 200 cc. water. The solution was kept alkaline by periodic additions of sodium hydroxide as required. Coupling was very rapid, and the resulting solution dyed silk directly to a bright golden orange.

*Example 6*

A slurry of 9.2 g. benzidine, 30 cc. concentrated hydrochloric acid and 150 cc. water at 5°-10° C. was tetrazotized with 7.2 g. sodium nitrite. In this solution, after destroying excess nitrous acid with sulfamic acid, were dipped a number of fibers which had been previously saturated with a solution of potassium-2-cyanopropane-1-sulfonate. The dye gave various shades with the following fibers:

Nylon_____Reddish-orange
Rayon_____Orange gold
Aralac_____Orange tan
Acetate rayon_____Pale gold
Raw silk_____Brilliant copper

Example 7

A slurry of 6.8 g. p-nitroaniline, 15 cc. concentrated hydrochloric acid and 100 cc. water was diazotized with 3.6 g. sodium nitrite at 5°–10° C. and the excess nitrous acid removed with sulfamic acid. The diazonium solution was coupled at room temperature with potassium butan-3-one-1-sulfonate. The resulting dye solution dyed various yarn swatches in the following shades:

| | |
|---|---|
| Nylon | Light orange |
| Acetate rayon | Golden brown |
| Raw silk | Bright orange |

In the claims, the term "diazotized" is intended to cover not only diazotized compounds but also polydiazotized compounds.

Since it is obvious that various changes and modifications may be made in the above description without departing from the nature and spirit thereof, this invention is not restricted thereto except as set forth in the appended claim.

We claim:

A solubilized azo dye wherein the azo group is directly bonded to the group in the chain of a beta-nitro alkane sulfonate to which the nitro group is also directly bonded.

MARVIN H. GOLD.
HAROLD H. LEVINE.

REFERENCES CITED

The following references are of record in the file of this patent:

UNITED STATES PATENTS

| Number | Name | Date |
|---|---|---|
| 2,251,921 | Dickey et al. | Aug. 12, 1941 |
| 2,310,181 | Mackenzie | Feb. 2, 1943 |
| 2,366,633 | Long | Jan. 2, 1945 |
| 2,392,167 | Long | Jan. 1, 1946 |
| 2,392,611 | Nygard et al. | Jan. 8, 1946 |
| 2,396,917 | Hanford | Mar. 19, 1946 |
| 2,441,800 | Degering | May 18, 1948 |